US006433999B1

(12) United States Patent
Muse et al.

(10) Patent No.: US 6,433,999 B1
(45) Date of Patent: Aug. 13, 2002

(54) BUS CONNECTION ACCESS PANEL

(75) Inventors: Peter D. Muse, Durham; James H. Cook, Wilmington; Gilbert A. Soares, Mebane, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/919,481

(22) Filed: Jul. 31, 2001

Related U.S. Application Data

(63) Continuation-in-part of application No. 09/524,959, filed on Mar. 14, 2000.

(51) Int. Cl.[7] ................................................. H02B 1/26
(52) U.S. Cl. .................... 361/624; 361/601; 361/611; 361/615; 361/616; 312/223.2
(58) Field of Search ................... 361/600, 601, 361/605, 611, 616–624, 627–632, 637–640, 641–649; 174/48, 66, 67; 312/223.1, 223.2

(56) References Cited

U.S. PATENT DOCUMENTS

| | | | |
|---|---|---|---|
| 1,307,019 A | 6/1919 | Olley ......................... 361/648 |
| 1,325,052 A | 12/1919 | Starrett ...................... 361/648 |
| 2,559,151 A | 7/1951 | Getzoff ....................... 439/136 |
| 4,420,078 A | * 12/1983 | Belt et al. ................... 206/305 |
| 4,433,204 A | * 2/1984 | Wuertz ........................ 174/48 |
| 4,743,206 A | 5/1988 | Imhoff ........................ 439/137 |
| 5,160,357 A | 11/1992 | Faber ......................... 55/385.2 |
| 5,654,871 A | 8/1997 | Wentler et al. ............. 361/622 |
| 5,831,813 A | 11/1998 | Gomez ........................ 361/622 |
| 5,866,868 A | 2/1999 | White et al. ................ 361/652 |
| 5,936,214 A | 8/1999 | Phillips ..................... 200/43.22 |
| 5,956,228 A | 9/1999 | Zahorsky et al. ........... 361/695 |

* cited by examiner

*Primary Examiner*—Boris Chervinsky
(74) *Attorney, Agent, or Firm*—Cantor Colburn LLP

(57) ABSTRACT

An access panel located in a motor control center for inspecting and accessing various bus connections, for example, a particular phase vertical to horizontal bus connection or a horizontal bus bar splice connection. The surface of the panel includes one or more apertures positioned to align with one or more bus bar connections. Covers are pivotally mounted along the surface of the panel adjacent to the apertures in order to access and isolate the bus connections within the motor control center. The cover is mounted to the surface of the panel such that it can be moveable between open and closed positions.

36 Claims, 5 Drawing Sheets

BUS CONNECTION ACCESS PANEL

CROSS REFERENCE TO RELATED APPLICATION

This application is a continuation-in-part of U.S. patent application Ser. No. 09/524,959, filed Mar. 14, 2000, which is incorporated by reference herein in its entirety.

BACKGROUND OF THE INVENTION

The present invention relates generally to access panels and more specifically to an access panel in motor control centers to inspect bus bar connections.

Motor control centers are commonly employed for performing various protection and control functions in industrial settings. In such motor control centers, three-phase electric power is fed from electric power distribution mains to the motor control center through a main circuit breaker within the control center. Within the motor control center housing, internal electric power is fed from the main circuit breaker to control center electrical components through horizontal and vertical main bus conductors. Electrical power is then fed through the bus conductors to internal electrical components mounted within the drawers or buckets. The buckets contain devices such as one or more circuit breakers, starters, overload protectors, or pilot devices. Electrical connection between the main vertical bus conductors and between the main circuit breaker and the main vertical bus conductors and the distribution bus conductors require suitable attachment hardware such as bolts. Further, high contact pressure is necessary to obtain a good electrical connection.

Bus conductors usually extend within a control center enclosure where the respective electrical connections are made. The associated buses are arranged within the control center enclosure and accessed by means of a cabinet or panel positioned on the front wall of the enclosure. Such enclosures have fixed back, side and top walls.

Where bolts are used to maintain bus to bus connections, the torque of the bolts must be checked periodically to assure the integrity of the connection. A loss of torque in the connection can lead to unwanted heat rise. Excess heat may also cause condensation and corrosion. It is also desirable to visually inspect energized connections while maintaining a safety barrier between connection and personnel. Further, it is desirable to measure the temperature of individual energized connections during operation without exposure of personnel to a high voltage connection.

Access panels of the prior art have provided access to bus connections by the use of sliding or pivoting panels that open to expose more than one phase of the current. Therefore, personnel cannot isolate one connection at a time but rather must expose more than one phase. In the prior art, an insulating barrier is not maintained during non-contacting temperature measurement nor is such barrier maintained during visual inspection. In order to visually inspect the high voltage connections, the panel must be opened which does not provide any insulating barrier between the connection and the personnel.

BRIEF SUMMARY OF THE INVENTION

In an exemplary embodiment of the invention, an access panel made of an electrically insulating material comprises a surface having a plurality of apertures disposed therein, with the apertures positioned to align with one or more bus bar connections. A plurality of covers is pivotally mounted on the surface of the panel from a point adjacent to the apertures, each aperture having one corresponding cover. The covers are configured to be moveable between an open and closed position. In the open position, the covers are pivotally rotated to provide access to the aperture. The positional relationship of the apertures and respective covers along the surface of the panel determines the access to at least one bus connection.

DETAILED DESCRIPTION OF THE INVENTION

Figure 1:
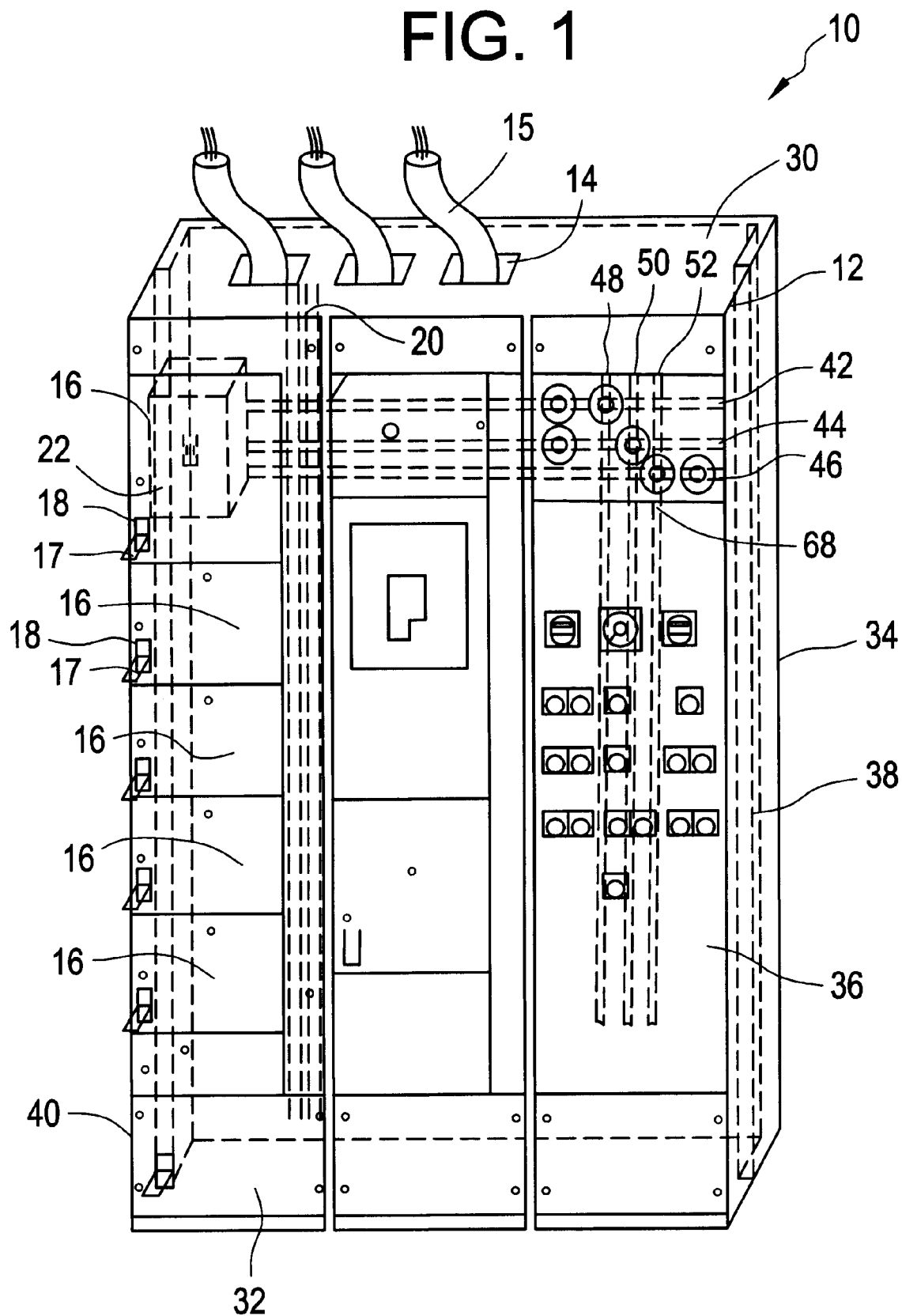
FIG. 1 is a front perspective view of a motor control center employing the access panel of this invention.

Referring to FIG. 1, a motor control center 10 is illustrated. The motor control center 10 consists of a metallic enclosure cabinet 12 including a top 30, a bottom 32, a back wall 34, two opposing side walls 38 and 40 and a front wall 36. The front wall 36 of cabinet 12 includes buckets 16 which house various internal electrical components such as one or more circuit breakers, starters, overload protectors, or pilot devices. Unless the top 30 or back wall 34 is disassembled, access to the internal electrical components is by corresponding handle operators 17 extending through slots 18 located within the respective bucket 16.

The motor control center 10 generally provides control and communication between the internal electrical components and an external electrical distribution system. The top 30 includes openings 14 to accept incoming power cables 15. The front wall 36 includes an access panel 68 providing access to a typical three phase bus bar system. While a three phase bus bar system is shown, the present invention is not limited to this configuration but may be applied to other configurations, such as one, two or four phase bus bar panel assemblies. Horizontal main bus conductors 42, 44 and 46 (shown in phantom) and vertical main bus conductors 48, 50 and 52 (shown in phantom) are located within cabinet 12. It is noted that there are vertical and horizontal bus conductors for all three phases. Three phase electric power is fed from the electrical power distribution system to the motor control center 10 through power cables 15 connected to a main circuit breaker 22. The internal electric power is fed from the main circuit breaker 22 to the internal electrical components through the horizontal bus conductors (bars) 42, 44 and 46 and the vertical bus conductors (bars) 48, 50 and 52. The vertical bus conductors 48, 50 and 52 connect the horizontal bus conductors 42, 44 and 46 to the internal electrical components housed within the motor control center 10. Ground bus bar 20 generally provides a common ground connection for buckets 16. Internal electrical components are generally protected by one or more circuit breakers 22.

Figure 2:
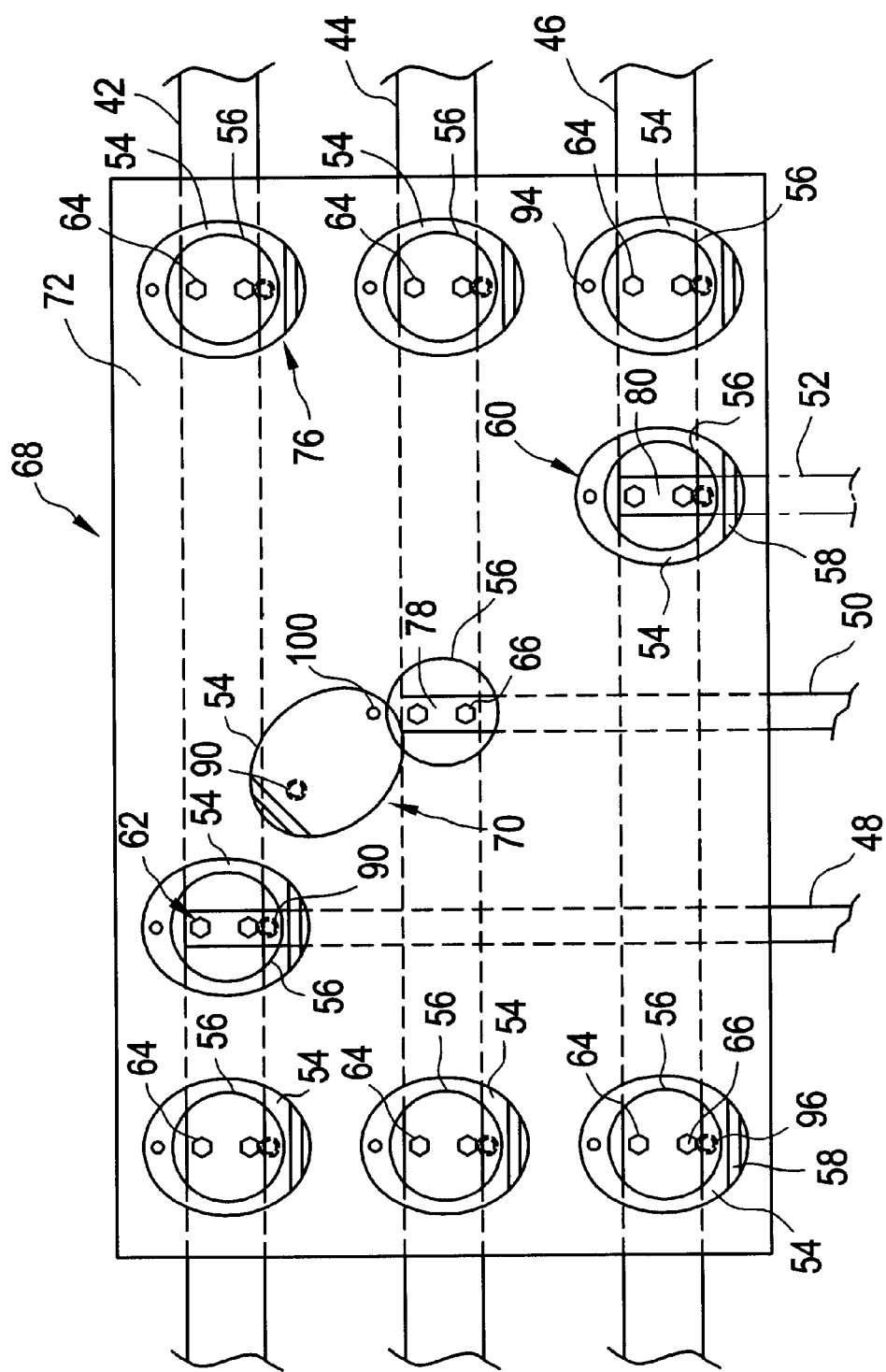
FIG. 2 is a front view of an access panel of the present invention.

Referring to FIG. 2, an enlarged view of the access panel 68 is shown. The panel 68 is constructed of a single panel and preferably fabricated from an electrically insulating material such as polymer material. The panel 68 provides access to various bus connections that are located within the motor control center 10, for example, a particular phase vertical to horizontal bus connection 62, 78 or 80 or a horizontal bus bar splice connection 64. Vertical to horizontal bus connections 62, 78 and 80 and horizontal bus bar splice connection 64 are typically fastened by means of bolts 66. The panel 68 can be of various sizes and shapes in order to accommodate a particular bus connection layout within a motor control center 10. Further, the panel 68 may provide access to one or more vertical to horizontal bus connections 62, 78 and 80, one or more horizontal bus bar splice connections 64 or any combination thereof.

Panel 68 includes a surface 72 that forms a portion of the front wall 36 of the cabinet 12 of the motor control unit 10. The panel 68 also includes a cover 54 mounted along the surface 72. The cover 54 is positioned so as to align with a corresponding aperture 56 thereby permitting access to one or more bus bar connections. For example, cover 54 can align with the horizontal bus bar splice connection 64 or with the vertical to horizontal bus connection 62.

The access panel 68 may also include multiple covers 54, with each cover 54 aligning with an aperture 56 disposed in surface 72 of panel 68. Each aperture 56 aligns with one or more horizontal bus bar splice connections 64 or with one or more phases of vertical to horizontal bus connections 62, 78 and 80. It will be appreciated that a plurality of apertures 56 and corresponding covers 54 can be selectively aligned over bus connections within the panel 68 thereby permitting visibility and access to the bus connections without exposing all the bus connections located within the panel 68.

Covers 54 each have a snap-fit fastener 94 proximate one end and a handle 58 proximate an opposite end. Each cover 54 is pivotally engaged at one end to the surface 72 of the panel 68, allowing the cover 54 to pivot from an open position 70 to a closed position 76. Further, each cover 54 and aperture 56 are of a size and shape large enough to receive a fastening tool, such as a socket wrench, to check the torque on bolt 66 or other similar fastening means. Thus, each cover 54 allows access to a single bus connection without unnecessary personnel exposure.

In the closed position 76, the cover 54 overlays the aperture 56, thereby preventing unplanned exposure to an electrical connection. The cover 54 can be pivotally rotated to the open position 70 to expose the aperture 56. As shown in FIG. 2, the cover 70 is in the open position exposing the aperture 56 through which a bus connection 62, 64, 78 or 80 is visible and accessible.

The cover 54 is made of an electrically insulating material. Preferably, cover 54 is made from a transparent, electrically-insulating material. Typically, individual bus connection heat rise measurement is permitted with the use of non-contact temperature measurement equipment, for example an infrared temperature measurement instrument. By using a transparent, electrically-insulating material for the cover 54, a temperature measurement can be obtained without opening the cover 54 to expose the high voltage connection. Thus, the cover 54 permits visual inspection and non-contact temperature measurement of bus connections while maintaining an insulating barrier between the personnel and the energized bus connection. Also, when the cover 54 is in the open position 70, the aperture 56 is exposed thereby permitting personnel to check the bolt torque on the respective deenergized bus connection by placing an appropriate tool though the aperture 56.

Figure 3:
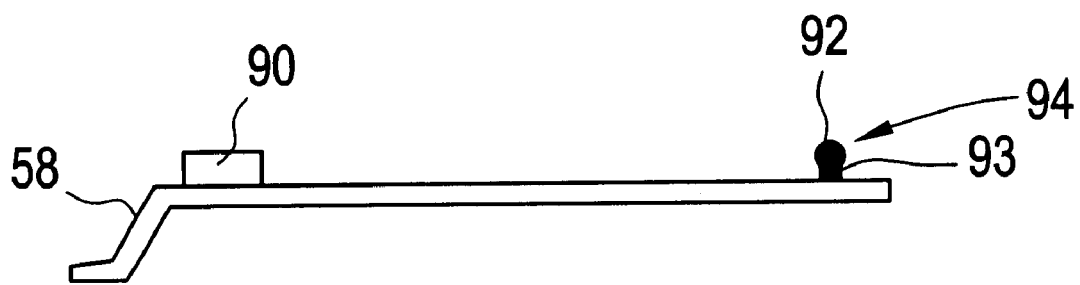
FIG. 3 is a side view of the cover of FIG. 2.

Referring to FIGS. 2 and 3, cover 54 is attached to the surface 72 of the panel 68 by means of a molded snap-fit fastener 94, preferably made of an electrically insulating material. The molded snap-fit fastener 94 is inserted into a corresponding first opening 100 on the surface 72 of the panel 68 so as to rotatably mount the cover 54 to the surface 72. The cover 54 also includes a position holding support 90, such as a boss, extending outward from the cover 54. The position holding support 90 is shown in phantom in FIG. 2. The position holding support 90 is configured for being inserted into the aperture 56 threreby retaining the cover 54 in the closed position 76. In the closed position 76, vibratory movement of the cover 54 and unplanned exposure of personnel to one or more bus connections is prevented.

Figure 4:
FIG. 4 is an alternative embodiment of the cover of FIG. 3.

Referring now to FIGS. 2 and 4, an alternative embodiment for the snap-fit fastener 94 is shown. The cover 54 is attached to the surface 72 by attachment hardware 74, such as a rivet, hinge or slide, so that the cover 54 can be opened to expose the aperture 56. Preferably, the attachment hardware 74 is made of an electrically insulating material.

Figure 5:
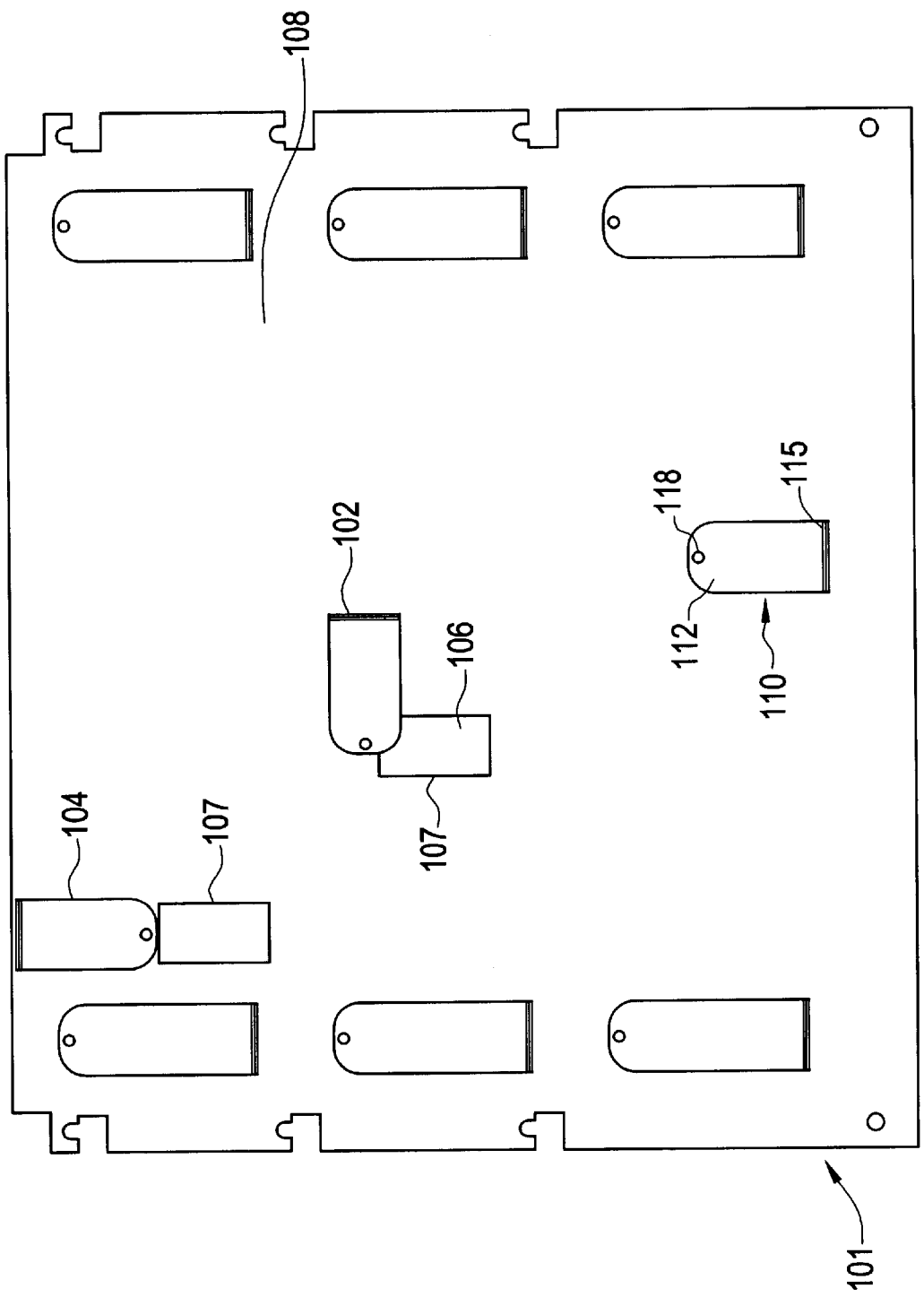
FIG. 5 is a front view of an alternative embodiment of the access panel of FIG. 2.

Referring to FIG. 5, an alternative embodiment of the present invention is shown. The access panel 101 includes a surface 108 that forms a portion of the front wall of cabinet of the motor control center 10 as described for access panel 68. The panel 101 also includes multiple rectangularly shaped apertures 106 aligned with one or more bus bar connections. A cover 110 having a shape substantially the same as aperture 106 is secured adjacent each aperture 106 so as to align with the aperture 106 when the cover 110 is in the closed position 105. It will be understood that the shape of the aperture 106 can be modified to any number of geometric shapes such as circles, ellipse, squares, rectangles and the like so long as the aperture provides access to the bus bar connections within motor control center 10.

Cover 110 is secured to the panel 101 using attachment hardware 118 that penetrates an opening 116, located within the cover 110 and a corresponding hole (not shown) in the panel 101 when the cover 101 is properly aligned with an aperture 106. The attachment hardware 118 secures cover 110 to the panel 101 so that the cover 110 can be pivotally rotated about the attachment hardware 118. It will be recognized that the attachment hardware 118 can be in the form of a rivet, bolt, screw and the like so long as the attachment hardware 118 allows the pivotal rotation of the cover 110 as described herein. In one embodiment the attachment hardware 118 is made of an electronically insulating material to reduce the potential that a short circuit could be caused due to inadvertent contact between metallic attachment hardware 118 and energized components within the motor control center 10.

In a preferred embodiment, the cover 110 has at least one hundred twenty degrees of rotation. In a most preferred embodiment the cover 110 has at least three hundred and sixty degrees of rotation. The greater the freedom of rotation of cover 110 the more adaptable the cover 110 is for use with surface mounted electrical control devices that a user may choose to mounted on surface 108. Further, the greater the available rotation of cover 110 the greater access is provided for the bus bar connections located behind the panel 101.

The invention is ideal for applications that have limited working space in front of the panel, because the cover can moved between the open position 104 and closed position 105 without having to move the cover in a direction perpendicular to the surface 108, to any significant degree. Thus, the invention is ideal for use in motor control centers.

Alternatively, the cover 110 can include a molded snap fit fastener 94, as shown in FIG. 3 for the first embodiment. As shown in FIG. 3, the neck 92 of the snap fit fastener 94 is narrower than the fastener tip 93. To install a cover having a snap fit fastener 94, the cover 110 is aligned with the aperture 106 so that the snap fit fastener 94 aligns with a first opening 100 located in the surface 108 just above aperture 106. The first opening 100 is just large enough to allow the fastener tip 92 to be forced through the first opening 100 by pressing the cover 110 toward the panel 101. When the cover is fully installed, the fastener tip 92 is located behind the surface 108 of the panel 101 and the narrow neck 93 of the snap fit fastener 94 comes to rest within the first opening 100. The diameter of the neck 93 allows the cover 110 to pivot at least 180 degrees around the first opening 100 in a plane parallel to the surface 108. The previously described range of embodiments related to the freedom of rotation of cover 110 applies a cover equipped with a snap-fit fastener 94. The snap fit fastener 94 can be integrally molded as part of the cover 110 to increase the strength and durability of the cover.

The cover 110, too, can be made of electrically insulating material in order to maintain an insulating barrier between personnel and the energized bus bar connections. In one embodiment, the cover 110 is made of transparent, electrically insulating material. A cover 110 made of transparent material permits visual inspection and non-contact temperature measurement of the bus connections. It will be understood that the cover can be made out of any material such as polycarbonate and the like so long as the material is both electrically insulating and transparent. Although the close 110 is rigid, it must also flex longitudinally as described herein. The advantages provided by a flexible cover are also described herein.

Figure 6:
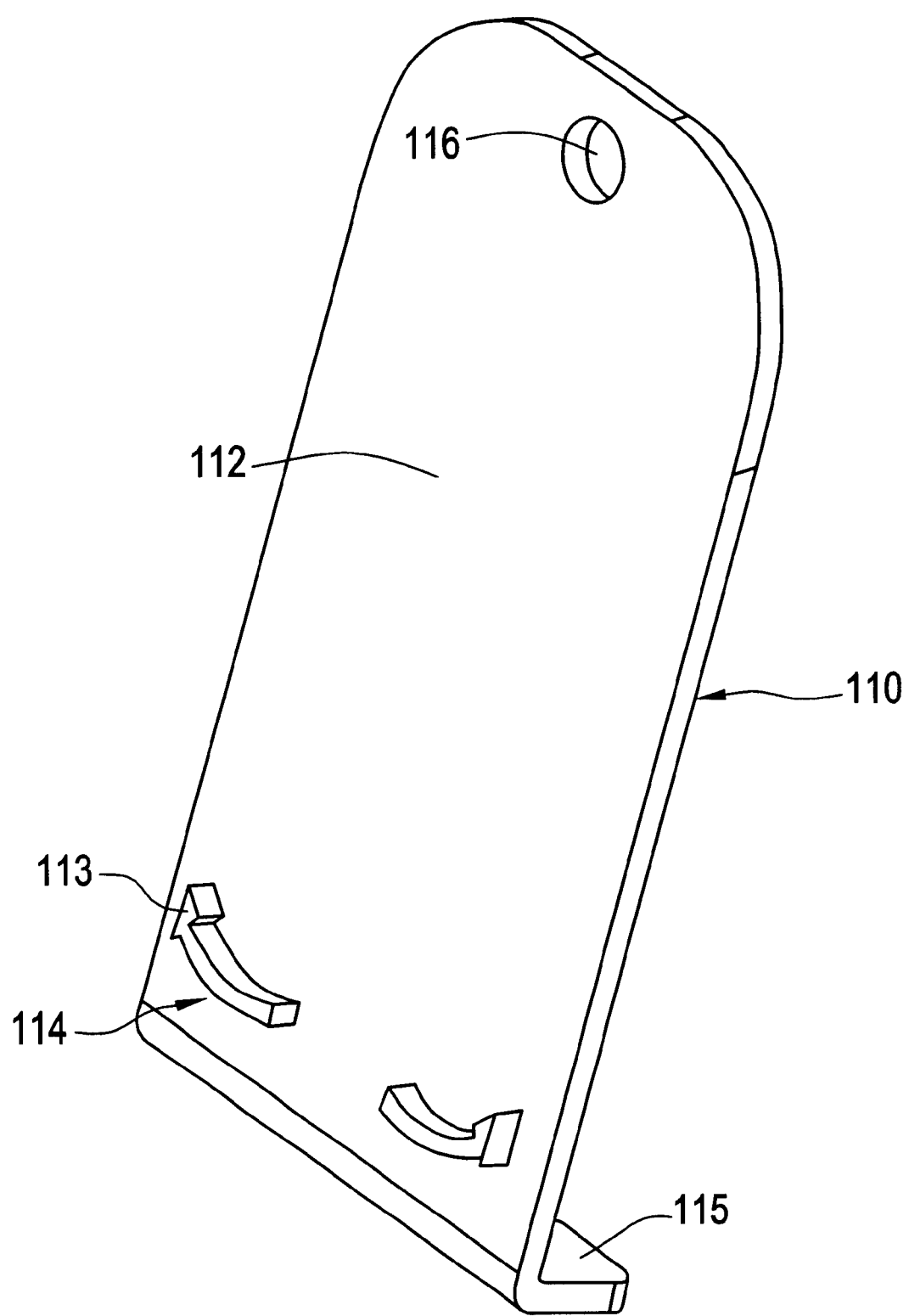
FIG. 6 is an isometric view of an alternative embodiment of the cover of FIG. 3.

Referring to FIG. 6, the cover 110 includes a handle 115 in the form of a lip protruding from the bottom of the cover 110 at approximately a ninety degree angle from the body 112 of the cover 110. The handle 115 allows the cover 110 to be grasped and be repositioned during use. One advantage of the handle 115 shown in FIG. 6 is that it is formed as an integral part of the cover 110. The one-piece construction of the cover 110 and handle 115 creates a stronger and more durable unit and reduces steps in the manufacturing process.

FIG. 6 shows two position holding supports 114 located on the back of cover 110. In the embodiment shown in FIG. 6, each position holding support 114 curves upward toward the edge 107 of the cover 110 and ends in a support tip 113. The location of the position holding supports on the back of the cover 110 places them within the aperture when the cover is in the closed position 105 and insure that the cover 110 is properly aligned within the aperture 106. The support tips 113 are adjacent the sides of the aperture 106 thereby preventing lateral movement of the cover 110 when in the closed position 105, FIG. 5. Lateral motion is prevented because the position holding supports create an interference that strikes edge 107 of the aperture 106 if the cover 110 shifts laterally while in the closed position 105.

As shown in FIG. 5, the cover 110 is moved between the closed position 105 and the fully open position 104 by grasping the handle 115. The bottom of the cover 110 is pulled slightly away from the surface 108 in a direction substantially perpendicular to the surface 108. The cover 110 remains attached to panel 101 by the attachment hardware 118 but flexes away from the panel at the handle end. The flex allows the position holding support 114 to clear the edge 107 of the aperture 106. The cover 110 can then be rotated in either a clockwise direction from the closed position 105 to the partially open position 103 and then to the fully open position 104, if desired.

Accordingly, the access panel 68 of this invention provides new concepts suitable for use in motor control units to enable an increase in range of useful operation by providing safeguards for both personnel and equipment. The access panel of this invention is readily adaptable to a variety of operating conditions, motor control centers or other similar enclosures containing high voltage electrical connections for which access to and inspection of is desirable.

While the invention has been described with reference to a preferred embodiment, it will be understood by those skilled in the art that various changes may be made and equivalents may be substituted for elements thereof without departing from the essential scope thereof. Therefore, it is intended that the invention not be limited to a particular embodiment disclosed as the best mode contemplated for carrying out this invention, but that the invention will include all embodiments falling within the scope of the appended claims.

What claimed is:

1. An enclosure for a bus bar system having a plurality of bus bar connections, the enclosure comprising:
   a panel extending over at least a portion of the bus bar system, the panel including an aperture disposed therein, said aperture is positioned to align with a single bus bar connection in the plurality of bus bar connections; and
   a cover pivotally mounted to said panel from a point adjacent to said aperture, said cover is pivotable between an open position for providing access to said single bus bar connection and a closed position wherein said cover covers said aperture.

2. The enclosure of claim 1 wherein said cover is made of an electrically insulating material.

3. The enclosure of claim 1 wherein said cover is made of a transparent material.

4. The enclosure of claim 1 further comprising:
   a snap-fit fastener coupled to said cover, said snap-fit fastener is received within a first opening in said panel for pivotally mounting said cover to said panel.

5. The enclosure of claim 1 further comprising:
   a boss extending outwardly from said cover and configured for insertion into said aperture, said boss releasably retaining said cover in the closed position.

6. The enclosure of claim 1 wherein said panel is made of a transparent material.

7. The enclosure of claim 1 wherein said panel is made of an electrically insulating material.

8. The enclosure of claim 1 wherein said cover is pivotally mounted to said panel by attachment hardware coupled to said cover and said panel.

9. A motor control center, comprising:
   a bus bar system including a plurality of bus bar connections; and
   a cabinet having a back wall, first and second opposing sidewalls, first and second opposing end walls and a front wall which substantially completely covers and protects said plurality of bus bar connections from access when closed, said front wall including:
      a panel having an aperture disposed therein and positioned to align with a single bus bar connection in said plurality of bus bar connections, and
      a cover pivotally mounted to said panel from a point adjacent to said aperture, said cover is pivotable between an open position for providing access to said single bus bar connection and a closed position wherein said cover covers said aperture.

10. The motor control center of claim 9 wherein said cover is made of an electrically insulating material.

11. The motor control center of claim 9 wherein said cover is made of a transparent material.

12. The motor control center of claim 9 further comprising:
   a boss extending outwardly from said cover and configured for being inserted into said aperture, said boss retaining said cover in the closed position.

13. The motor control center of claim 9 further comprising:
   a snap fit fastener coupled to said cover, said snap-fit fastener is received within a first opening in said panel for pivotally mounting said cover to said panel.

14. The motor control center of claim 9 wherein said panel is made of a transparent material.

15. The motor control center of claim 9 wherein said cover is pivotally mounted to said panel by attachment hardware coupled to said cover and said panel.

16. The motor control center of claim 9 wherein said panel is made of an electrically insulating material.

17. An enclosure for housing a plurality of busbar connections, the enclosure comprising:
   a panel having an aperture disposed therein and positioned to align with one or more bus bar connections; and
   a cover made of a transparent material and pivotally mounted to said panel from a point adjacent to said aperture, said cover moveable between an open position and a closed position and configured to cover said aperture in the closed position.

18. The enclosure of claim 17 wherein said cover is made of an electrically insulating material.

19. The enclosure of claim 17 wherein said cover includes a snap-fit fastener depending therefrom, said snap-fit fastener is received within a first opening in said panel so as to rotatably mount said cover to said panel.

20. The enclosure of claim 17 further comprising:
   a boss extending outwardly from said cover and configured for insertion into said aperture, said boss retaining said cover in the closed position.

21. The enclosure of claim 17 wherein said panel is made of transparent material.

22. The enclosure of claim 17 wherein said panel is made of an electrically insulating material.

23. An enclosure suitable for housing a plurality of bus bar connections, the enclosure comprising;
   a panel having an aperture disposed therein and positioned to align with a single bus bar connection; and
   a cover pivotally mounted to said panel and moveable between an open position and a closed position, wherein said cover rotates in a plane parallel to said panel.

24. The enclosure of claim 23, wherein said cover is equipped with a snap-fit fastener.

25. The enclosure of claim 24, wherein said snap fit fastener includes a fastener tip having a larger diameter than a neck of said snap-fit fastener.

26. The enclosure of claim 25, wherein said snap fit fastener is located behind said panel when said cover is installed.

27. The enclosure of claim 23, wherein said cover is equipped with a position holding support.

28. The enclosure of claim 27, wherein said position holding support is located within said aperture when said cover is in said closed position and aligns said cover in said aperture.

29. The enclosure of claim 28, wherein said position holding support has a support tip located adjacent edge of said aperture when said cover is in said closed position.

30. The enclosure of claim 23, wherein said cover is capable of at least one hundred eighty degrees of rotation.

31. The enclosure of claim 23, wherein said cover is capable of three hundred and sixty degrees of rotation.

32. An enclosure suitable for housing a plurality of bus bar connections, the enclosure comprising:
   a panel having a first aperture and a second aperture disposed therein, said first aperture is positioned to align with a first bus bar connection in said plurality of bus bar connections, said second aperture is positioned to align with a second bus bar connection in said plurality of bus bar connections;
   a first cover pivotally mounted to said panel at a point adjacent to said first aperture, said first cover rotates in a plane parallel to said panel to allow access to said first bus bar connection; and
   a second cover pivotally mounted to said panel at a point adjacent to said second aperture, said second cover rotates in a plane parallel to said panel to allow access to said second bus bar connection.

33. The enclosure of claim 32 wherein said cover is made of a transparent material.

34. The enclosure of claim 32 further comprising:
   a first snap-fit fastener coupled to said first cover, said first snap-fit fastener is received within a first opening in said panel for pivotally mounting said first cover to said panel.

35. The enclosure of claim 32 further comprising:
   a boss extending outwardly from said first cover and configured for insertion into said first aperture, said boss releasably retaining said cover in the closed position.

36. The enclosure of claim 32 wherein said panel is made of a transparent material.

* * * * *